United States Patent [19]

Avrukh et al.

[11] 4,313,068

[45] Jan. 26, 1982

[54] GAS-COOLED ELECTRIC MACHINE

[76] Inventors: Vladimir J. Avrukh, 2 Setunsky proezd, 11, kv. 121; Leonid A. Duginov, ulitsa Graivoronovskaya, 8, korpus 1, kv. 155; Jury I. Azbukin, Dokuchaev pereulok, 13, kv. 100; Valery A. Shelepov, 2 Setunsky proezd, 11, kv. 138, all of Moscow; Elrikh I. Gurevich, prospekt Kosmonavtov, 50, korpus 4, kv. 72, Leningrad, all of U.S.S.R.

[21] Appl. No.: 140,978

[22] Filed: Apr. 17, 1980

[30] Foreign Application Priority Data

Apr. 27, 1979 [SU] U.S.S.R. ............................... 2751854

[51] Int. Cl.³ .............................................. H02K 9/00
[52] U.S. Cl. ........................................ 310/58; 310/59; 310/214
[58] Field of Search ........................ 310/58, 52, 53, 54, 310/55, 56, 57, 59, 60, 61, 62, 63, 64, 65, 214, 215

[56] References Cited

U.S. PATENT DOCUMENTS 3,517,232 6/1970 Sano ............................... 310/214 X

FOREIGN PATENT DOCUMENTS 550723 11/1960 U.S.S.R. .
509947 2/1973 U.S.S.R. .

Primary Examiner—Gene Z. Rubinson
Assistant Examiner—Morris Ginsburg
Attorney, Agent, or Firm—Lilling & Greenspan

[57] ABSTRACT

The gas-cooled electric machine of the present invention comprises a rotor, a stator having a core with radial ducts and slots on the inner surface, a winding arranged in the slots of the stator core, and slot wedges provided with projections arranged in the stator-to-rotor air gap lengthwise the longitudinal axis of the electric machine, the above said projections being provided on part of the slot wedges. Each of the projections has a base sloping towards the stator inner surface, a longitudinal rib adjacent the base end most removed from stator and facing the rotor, two side walls parallel to each other arranged in the stator transverse planes and facing the stator inner surface. The space formed between the projection base and the stator inner surface communicates with the radial ducts in the stator core. The present invention makes it possible to increase the output power of the electric machine within the existent overall dimensions thereof, or to reduce the consumption of materials and diminish the overall dimensions of the electric machine with a given output power thereof.

13 Claims, 2 Drawing Figures

GAS-COOLED ELECTRIC MACHINE

The present invention relates to electric machine-making and has particular reference to a gas-cooled electric machine.

FIELD OF THE INVENTION

The invention can find application in turbogenerators featuring radial vent ducts on a stator with radial and radial-axial flow ventilation systems.

BACKGROUND OF THE INVENTION

A gas-cooled electric machine (cf. USSR Inventor's Certificate No. 509,947 issued on Feb. 16, 1973) is known to comprise a rotor and a stator which has a core with radial ducts and slots on its inside surface, a winding arranged in the slots of the stator core, and slot wedges having projections located in the stator-to-rotor air gap lengthwise the axis of the electric machine involved.

The projections of the slot wedges decelerate the flow of gas rotating along with the rotor, thus adding to the gas flow velocity relative to the rotor. This, however, impairs stator cooling conditions owing to a reduced gas flow velocity with respect to the stator and the resultant drop of the rate of gas flow through the radial ducts.

Another prior-art gas-cooled electric machine (cf. USSR Intentor's Certificate No. 550,723, cl.H02K 3/48, issued 1960) is known to comprise a rotor and a stator which has a core with radial ducts and slots on its inside surface, a winding arranged in the slots of the stator core, and slot wedges having projections located in the stator-to-rotor air gap lengthwise the axis of the electric machine under consideration.

Projections that protrude into the stator-to-rotor air gap feature longitudinally alternating cross slots and teeth.

In the abovesaid gas-cooled electric machine the teeth of the wedge projections decelerate the tangentially rotating gas flow, thus increasing the gas flow velocity relative to the rotor and providing an efficient cooling of the rotor, while the slots in the wedge projections eliminate the zones with a higher gas pressure in the air gap and, hence, stator overheating.

However, there remain some zones in the stator, arranged oppositely to the wedge projections, wherein overheating occurs, which affects adversely stator cooling; at the same time rotor cooling is but of an inadequate efficiency as the wedge projections are not provided throughout the stator length.

Moreover, the assembling procedure of the abovesaid known gas-cooled electric machine is difficult due to a necessity to accurately fit the rotor into the stator so as to preserve intact the wedge projections.

SUMMARY OF THE INVENTION

An object of the present invention is to provide a gas-cooled electric machine featured by an improved cooling.

Another object of the present invention is to provide a gas-cooled electric machine enabling its simpler assembling.

The abovesaid objects are accomplished due to the fact that in a gas-cooled electric machine, comprising a rotor and a stator, which has a core having radial ducts and slots on its inside surface, a winding arranged in the slots of the stator core, and slot wedges having projections located in the stator-to-rotor air gap lengthwise the electric machine involved, according to the invention, the projections are provided on part of the slot wedges, and each of the projections has a base sloping towards the stator inside surface, a longitudinal rib adjacent the base end most removed from the stator and facing the rotor, two side walls parallel to each other, situated in the stator transverse planes and facing the stator inside surface, so as to establish a space confined within the projection base and the stator inside surface and communicating with the radial ducts of the stator core.

It is expedient that the projections be provided on at least two slot wedges spaced equidistantly over the stator inside surface.

It is preferential that at least two projection-bearing slot wedges tangentially adjacent each other, form a group, and that at least two such groups spaced equidistantly over the stator inside surface, be arranged alternately with the slot wedges devoid of the projections.

It is likewise reasonable that a tangential clearance be provided between the projections of the adjacent slot wedges in each of the groups.

It is practicable that the longitudinal rib of each of the following projections in the group should be of increased height in the direction of the rotor revolving.

It is preferable that the longitudinal rib of each of the projections be made in an elastic material.

The present invention is instrumental in increasing the rate of gas flow through the stator radial ducts and improving stator cooling conditions, while the provision of the wedge projections throughout the stator length adds to the efficiency of the gas flow deceleration in the air gap and, hence, improves rotor cooling. A reduced degree of gas overheating in the air gap of the electric machine is also conductive to a lower heating of the machine active components in general.

The present invention also makes it possible, with a given output power, to cut down consumption of materials, reduce overall dimensions of the electric machine, or increase its output power within the same overall dimensions. The invention is likewise practicable in simplifying the assembly procedure and repairs of a gas-cooled electric machine.

BRIEF DESCRIPTION OF THE DRAWINGS

In what follows the present invention will be illustrated by a detailed description of a specific exemplary embodiment thereof given with reference to the accompanying drawings, wherein.

DETAILED DESCRIPTION OF THE INVENTION

Figure 1:
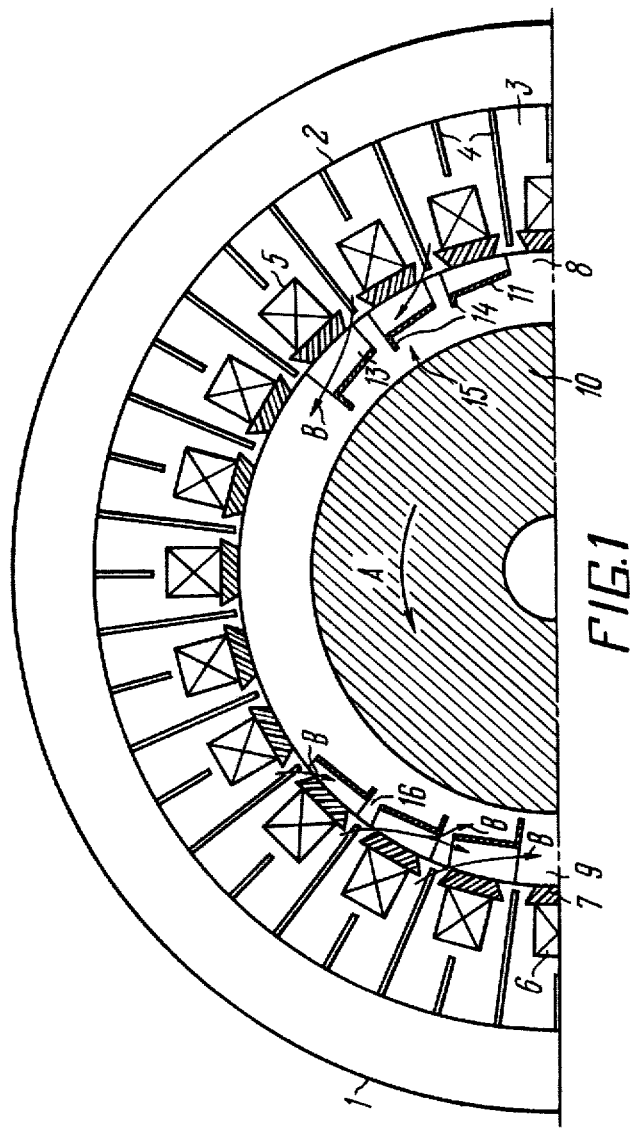
FIG. 1 is a schematic cross-sectional view of a gas-cooled electric machine, according to the present invention.
Figure 2:
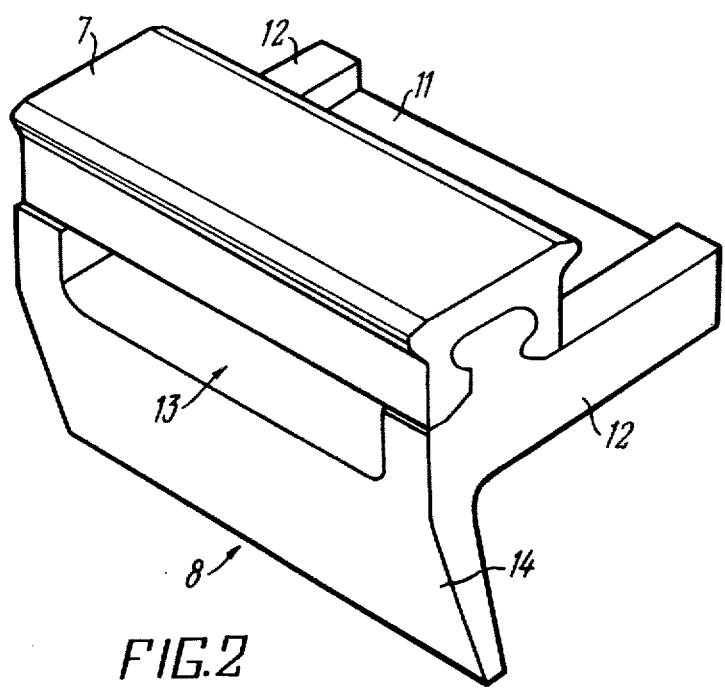
FIG. 2 is a perspective view of the slot wedge with the projection, according to the present invention.

The gas-cooled electric machine considered herein comprises a stator 1 (FIG. 1) which has a core 2 provided with radial ducts 3 and spacer bars 4, and slots 5 on its inner surface. The electric machine under consideration comprises also a winding 6 arranged in the slots 5 and held in place by slot wedges 7 built up as for length and provided with projections 8 held to the slot wedges 7 by means of a dovetail joint and located in an air gap 9 between the stator 1 and a rotor 10 lengthwise the longitudinal axis of the electric machine. The stator 1 and the rotor 10 are arranged coaxially, and their longitudinal axis is in fact the longitudinal axis of the electric machine. The projections 8 of the slot wedges 7 are made solid throughout the length of the stator 1. Each of the projections 8 (FIG. 2) has a base 11 sloping towards the inner surface of the stator 1 (FIG. 1), two side walls 12 (FIG. 2) parallel to each other, arranged in the transverse plane of the stator 1 (FIG. 1) and facing its inner surface. As a result, a space 13 is established between the base 11 of the projection 8 and the inner surface of the stator 1, communicating with the radial ducts 3 of the core 2 of the stator 1. A longitudinal rib 14 which faces the rotor 10, adjoins the end of the base 11 most removed from the stator 1.

The abovesaid projections 8 may be provided on at least two slot wedges 7 of the winding 6 of the stator 1, spaced equidistantly over the inner surface of the stator 1, owing to the fact that a favourable effect upon the cooling conditions of the electric machine can be obtained with such a minimum number of the projections 8.

At least two adjacent slot wedges 7 with the projections 8, adjoining each other tangentially with their bases 11 and the side walls 12, establish a group 15, and at least two of the abovesaid groups 15 spaced equidistantly over the inner surface of the stator 1, are arranged alternately with the slot wedges 7 devoid of the projections 8. In the herein-proposed electric machine there are provided four groups 15, each of these containing three slot wedges 7 with projections 8.

Integrating of the slot wedges 7 into the groups 15 makes it possible to define a tangentially developed space, whereby the increased-pressure zone effective at the longitudinal rib 14 will be situated most distantly from the space portion adjacent to the end of the base 11 nearest to the stator 1. A minimum practicable quantity of the groups 15 of the slot wedges 7 equals two like that of the individual projections 8 of the slot wedges 7.

For the sake of easy assemblying of the electric machine, a tangential clearance 16 is provided between the projections 8 of the adjacent slot wedges 7 in the group 15.

The longitudinal rib 14 of each of the following projections 8 in the group 15 of the slot wedges features an increased height in the direction of rotation of the rotor 10 (indicated by an arrow A), which makes it possible to use efficiently the dynamic head produced by the rotating gas flow and increase the rate of gas flow through the radial ducts 3.

With a view to facilitating the fitting of the rotor 10 into the stator 1 the longitudinal rib 14 of each of the projections 8 is made in an elastic material, say, rubber which enables the clearance between the rotor 10 and the longitudinal rib 14 to be reduced. The pathways of the gas flow in a gas-cooled electric machine with an exhaust ventilation system are shown by arrows B in the drawing.

In the case of a gas-cooled electric machine with an exhaust ventilation system gas is fed by blower fans (not shown) from the space above the core 2 of the stator 1 to the radial ducts 3 and further on to the air gap 9.

Then the gas in the air gap 9 is vigorously whirled by virtue of rotation of the rotor 10 in the direction facing the arrow A, so as to establish increased-pressure zones before the longitudinal ribs 14 and rarefied zones past these ribs. The space 13 defined in the projections 8 of the slot wedges 7, serves as an enjector for the gas flow passing through the radial ducts 3 to the air gap 9, which increases the rate of gas flow through the radial ducts 3 and improves the cooling of the stator 1. Further on the gas from the air gap 9 passes to the blower fans again. A general overheating of the gas in the electric machine involved is also reduced.

In the case of a force ventilation system, gas is fed by blower fans to the air gap 9 and further to the radial ducts 3 of the stator 1. The space 13 established in the projections 8 of the slot wedges 7, serves in this case as an inducer (of the guide apparatus) for the gas flow admitted from the air gap 9 to the radial ducts 3 and further on to the space above the core 2 of the stator 1 to return to the blower fans. The rate of gas flow through the radial ducts 3 is also increased in this case.

Application of the given invention in the cases of the above-considered ventilation systems makes it possible to increase the rate of gas flow through the radial ducts 3 of the stator 1 and improve the cooling of the stator, while the longitudinal ribs 14 of the projections 8 of the slot wedges 7 decelerate the gas flow rotating tangentially, thus adding to the gas flow velocity with respect to the rotor 10 and providing an efficient cooling of the rotor.

This in turn makes it possible to increase the output power of the electric machine within the existent overall dimensions thereof, or to reduce the consumption of materials and diminish the overall dimensions of the electric machine with a given output power thereof. In addition, the constructional arrangement of a gas-cooled electric machine considered in the present invention makes it possible to speed up assembly and repairs of such a machine.

What is claimed is:

1. A gas-cooled electric machine, comprising:
   a rotor; a longitudinal axis of said rotor;
   a stator, making up an air gap with respect to said rotor, and having an inner surface and a transverse plane;
   a core of said stator having an inner surface;
   a plurality of radial ducts, and a plurality of slots on said inner surface;
   windings arranged in respective slots of said core of said stator;
   a plurality of slot wedges in said core holding respective windings in place;
   a plurality of projections arranged in said air gap between said stator and said rotor lengthwise the longitudinal axis of said rotor and provided on at least two of said slot wedges;
   a base of each of said projections, sloping towards said inner surface of said stator;
   a longitudinal rib of each of said projections, adjacent an end of said base that is most removed from said stator, and facing said rotor;
   two parallel side walls of each of said projections, arranged in said transverse plane of said stator and facing said inner surface of said stator;
   a space confined within said base of each of said projections and said inner surface of said stator and communicating with said radial ducts in said core of said stator.

2. A gas-cooled electric machine as claimed in claim 1, wherein:
   at least two of said slot wedges are spaced equidistantly over said inner surface of said stator;
   said projections are provided on at least two of said slot wedges.

3. A gas-cooled electric machine as claimed in claim 1, wherein:
   at least two adjacent slot wedges having said projections adjoining tangentially each other to form a group;
   at least two groups spaced equidistantly over said inner surface of said stator and arranged alternately with said slot wedges devoid of said projections.

4. A gas-cooled electric machine as claimed in claim 1, wherein:
   said longitudinal rib of each of said projections is made of an elastic material.

5. A gas-cooled electric machine as claimed in claim 2, wherein:
   said longitudinal rib of each of said projections is made of an elastic material.

6. A gas-cooled electric machine as claimed in claim 3, wherein:
   said projections of said adjacent slot wedges in each of said groups are arranged with a tangential clearance.

7. A gas-cooled electric machine as claimed in claim 3, wherein:
   said longitudinal rib of each of said projections in each of said groups has an increased height at an end in the direction of rotation of said rotor.

8. A gas-cooled electric machine as claimed in claim 3, wherein:
   said longitudinal rib of each of said projections is made of an elastic material.

9. A gas-cooled electric machine as claimed in claim 6, wherein:
   said longitudinal rib of each of said projections in each of said groups has an increased height at an end in the direction of rotation of said rotor.

10. A gas-cooled electric machine as claimed in claim 6, wherein:
    said longitudinal rib of each of said projections is made of an elastic material.

11. A gas-cooled electric machine as claimed in claim 6, wherein:
    said longitudinal rib of each of said projections is made of an elastic material.

12. A gas-cooled electric machine as claimed in claim 6, wherein:
    said longitudinal rib of each of said projections is made of an elastic material.

13. A gas-cooled electric machine as claimed in claim 9, wherein:
    said longitudinal rib of each of said projections is made of an elastic material.

* * * * *